(12) United States Patent
Bernard

(10) Patent No.: US 12,180,913 B2
(45) Date of Patent: Dec. 31, 2024

(54) DUCTED FAN OF AN AIRCRAFT, AIRCRAFT, AND COMPONENT THEREOF

(71) Applicant: Dr. Ing. h.c. F. Porsche Aktiengesellschaft, Stuttgart (DE)

(72) Inventor: Benjamin Bernard, Karlsruhe (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/549,913

(22) Filed: Dec. 14, 2021

(65) Prior Publication Data
US 2022/0185468 A1 Jun. 16, 2022

(30) Foreign Application Priority Data
Dec. 15, 2020 (DE) .................. 10 2020 133 449.4

(51) Int. Cl.
*F02K 5/00* (2006.01)
*B64C 29/00* (2006.01)

(52) U.S. Cl.
CPC ............ *F02K 5/00* (2013.01); *B64C 29/0016* (2013.01); *F05D 2260/962* (2013.01)

(58) Field of Classification Search
CPC ... B64C 11/00; B64C 11/001; B64C 29/0016; B64C 2220/00; F02K 5/00; F05D 2260/962
See application file for complete search history.

(56) References Cited

U.S. PATENT DOCUMENTS

| | | | |
|---|---|---|---|
| 2,783,008 A | | 2/1957 | Bodine, Jr. |
| 5,653,404 A | * | 8/1997 | Ploshkin .................. B63G 8/08 244/73 C |
| 9,334,059 B1 | * | 5/2016 | Jones .................... G10K 11/168 |
| 2003/0183799 A1 | * | 10/2003 | Oishi .................... G10K 11/162 252/62 |
| 2004/0040312 A1 | | 3/2004 | Hoffjann et al. |
| 2017/0132999 A1 | * | 5/2017 | Coakley ............... G10K 11/172 |
| 2020/0010186 A1 | * | 1/2020 | Bender ................... B64C 11/28 |
| 2020/0010210 A1 | * | 1/2020 | Warbeck ................ B64D 33/10 |
| 2021/0394895 A1 | * | 12/2021 | Knoll .................... B64C 11/001 |

(Continued)

FOREIGN PATENT DOCUMENTS

| | | |
|---|---|---|
| DE | 102018116144 A1 | 1/2020 |
| DE | 102018116147 A1 | 1/2020 |

(Continued)

*Primary Examiner* — Michael H Wang
(74) *Attorney, Agent, or Firm* — LEYDIG, VOIT & MAYER, LTD.

(57) ABSTRACT

A ducted fan of an aircraft includes a rotor-side fan and a stator-side duct that surrounds the rotor-side fan radially at the outside and defines a flow channel for air flowing via the fan. The stator-side duct has an inner wall that faces toward the rotor-side fan and which is perforated at least in certain sections. The stator-side duct has an outer wall that faces away from the fan. Between the inner wall and the outer wall of the stator-side duct, there are formed cavities which, forming sound-deadening resonators, are coupled via the perforated inner wall to the flow channel for the air flowing via the rotor-side fan. The cavities are filled, in a region which faces away from the inner wall and thus faces toward the outer wall, with activated carbon.

20 Claims, 4 Drawing Sheets

(56) References Cited

U.S. PATENT DOCUMENTS

| | | | |
|---|---|---|---|
| 2022/0041264 A1* | 2/2022 | Scholl | B64C 3/32 |
| 2022/0099110 A1* | 3/2022 | Carr | B64C 29/0033 |
| 2022/0161937 A1* | 5/2022 | Fujiwara | F04D 29/326 |

FOREIGN PATENT DOCUMENTS

| | | |
|---|---|---|
| DE | 102018116149 A1 | 1/2020 |
| DE | 102018116153 A1 | 1/2020 |
| DE | 102018116166 A1 | 1/2020 |
| DE | 102018123470 A1 | 3/2020 |
| EP | 1340736 A | 9/2003 |
| EP | 3492247 A2 | 6/2019 |
| WO | WO 2019022618 A1 | 1/2019 |

* cited by examiner

DUCTED FAN OF AN AIRCRAFT, AIRCRAFT, AND COMPONENT THEREOF

CROSS REFERENCE TO RELATED APPLICATIONS

This application claims benefit to German Patent Application No. DE 10 2020 133 449.4, filed on Dec. 15, 2020, which is hereby incorporated by reference herein.

FIELD

The disclosure relates to a ducted fan of an aircraft and to an aircraft. The disclosure furthermore relates to a component of an aircraft.

BACKGROUND

DE 10 2018 116 144 A1 discloses an aircraft having a fuselage and having wings which engage on the fuselage. Ducted fans are integrated into the wings. The ducted fans can be covered by slats. The ducted fans may be horizontally or vertically fixed. Horizontally fixed ducted fans serve for the propulsion of the aircraft during a vertical takeoff or a vertical landing. Vertically fixed ducted fans serve for generating forward thrust for the aircraft.

DE 10 2018 123 470 A1 has disclosed an aircraft in the case of which multiple ducted fans are integrated into a wing.

DE 10 2018 116 147 A1 has disclosed a further aircraft. Here, fans which assist the vertical takeoff or a vertical landing of the aircraft engage on a nose of the fuselage of the aircraft.

DE 10 2018 116 153 A1 has disclosed an aircraft in which ducted fans engage on a fuselage, specifically the nose of the fuselage, of the aircraft. Here, two ducted fans are combined to form a unit which is pivotable about an axis of rotation, wherein said axis of rotation runs parallel to a pitch axis of the aircraft.

DE 10 2018 116 166 A1 discloses the basic construction of a ducted fan of an aircraft. According thereto, a ducted fan comprises a rotor-side fan, also referred to as rotor, and a stator-side duct, wherein the duct surrounds the fan radially at the outside. The duct defines a flow channel, extending in an axial direction, for air flowing via the fan.

DE 10 2018 116 149 A1 has disclosed a further ducted fan of an aircraft. DE 10 2018 120 200 A1 also discloses a ducted fan of an aircraft. In the case of this ducted fan, an electric machine is integrated into the duct.

Noise is generated during the operation of a ducted fan. There is a demand to design a ducted fan such that as little noise as possible is generated during the operation thereof.

U.S. Pat. No. 2,783,008 A has disclosed an aerodynamic component of an aircraft, specifically a wing, in which a cavity is delimited by two walls. One of the walls is formed as a perforated wall with recesses. The cavity is filled with an element composed of a sound-absorbing material, specifically with glass fiber wool.

EP 1 340 736 A has disclosed a porous, sound-absorbing material that comprises a framework composed of aggregates with voids. Voids of the aggregates are in this case smaller than voids between the aggregates. Material that forms the voids, that is to say material that forms walls that delimit the voids, comprises activated carbon or carbon grains.

SUMMARY

In an embodiment, the present disclosure provides a ducted fan of an aircraft. The ducted fan includes a rotor-side fan and a stator-side duct that surrounds the rotor-side fan radially at the outside and defines a flow channel for air flowing via the fan. The stator-side duct has an inner wall that faces toward the rotor-side fan and which is perforated at least in certain sections. The stator-side duct has an outer wall that faces away from the fan. Between the inner wall and the outer wall of the stator-side duct, there are formed cavities which, forming sound-deadening resonators, are coupled via the perforated inner wall to the flow channel for the air flowing via the rotor-side fan. The cavities are filled, in a region which faces away from the inner wall and thus faces toward the outer wall, with activated carbon.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The present disclosure provides a new ducted fan of an aircraft, an aircraft having a ducted fan of said type, and a component of an aircraft.

The ducted fan has a rotor-side fan and a stator-side duct, which surrounds the fan radially at the outside and defines a flow channel for air flowing via the fan, wherein the duct has an inner wall which faces toward the fan and which is perforated at least in certain sections, wherein the duct has an outer wall which faces away from the fan.

Between the inner wall and the outer wall of the duct, there are formed cavities which, forming sound-deadening resonators, are coupled via the perforated inner wall to the flow channel for the air flowing via the fan, and wherein the cavities are filled, in a region which faces away from the inner wall and thus faces toward the outer wall, with activated carbon.

The present disclosure proposes for the first time a ducted fan of an aircraft in the case of which cavities that are formed between the inner wall and the outer wall of the duct are partially filled with activated carbon, specifically in a region which faces away from the inner wall and thus faces toward the outer wall of the duct. Particularly effective sound deadening on a ducted fan of an aircraft is possible in this way.

That region of the cavities which is filled with activated carbon preferably occupies between 10% and 60% of the volume of the respective cavity. This allows particularly effective sound deadening on a ducted fan.

In one advantageous refinement, the activated carbon is present in the form of an activated carbon nonwoven or of an activated carbon mat. Alternatively, the activated carbon is present in the form of activated carbon granulate that is held in a plastics membrane. An activated carbon nonwoven or an activated carbon mat or a plastics membrane that holds activated carbon granulate can be particularly advantageously arranged in the cavities and thus particularly advantageously provide the sound deadening for the ducted fan.

Preferred developments of the disclosure will emerge from the description below. Exemplary embodiments of the disclosure will be explained in more detail on the basis of the drawings, without being restricted thereto.

Figure 1:
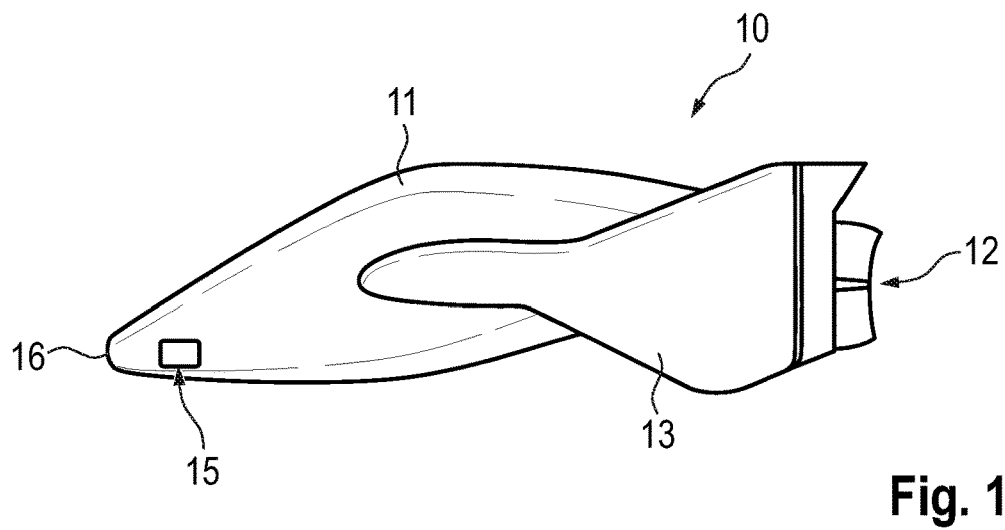
FIG. 1 shows a side view of an aircraft.
Figure 2:
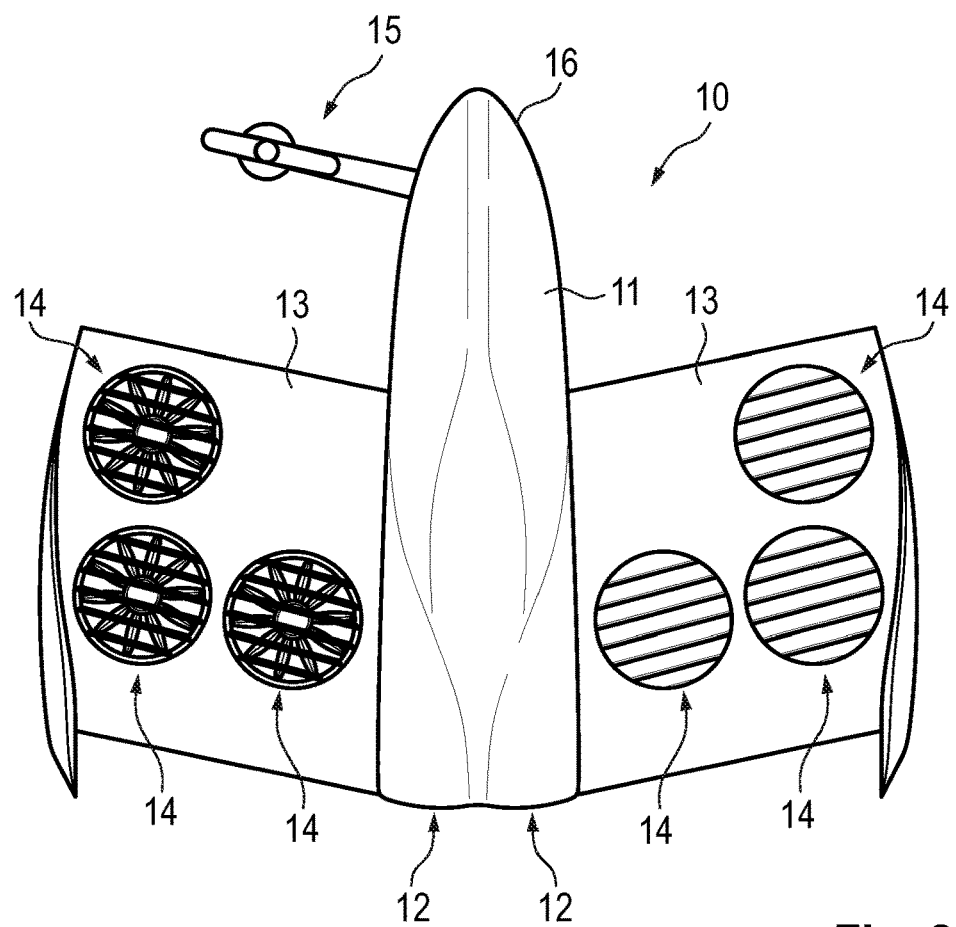
FIG. 2 shows a plan view of the aircraft.

FIGS. 1 and 2 show different views of an aircraft 10. The aircraft 10 has a fuselage 11, which provides, inter alia, a passenger compartment. The aircraft 10 furthermore has wings 13 which engage on the fuselage 11.

The aircraft 10 is a so-called vertical takeoff aircraft which, upon takeoff, lifts off from the ground vertically and, upon landing, lands on the ground vertically. In order to allow such vertical takeoff and landing of the aircraft 10, the aircraft 10 has in each case at least one wing lift unit 14, also referred to as WLU, at least in the region of each wing 13. In the exemplary embodiment shown, in each case three such wing lift units 14 are provided in each wing 13.

The vertical takeoff and landing of the aircraft 10 that takes place through the use of the wing lift units 14 can be assisted by means of at least one nose lift unit 15 which engages on a nose 16 of the fuselage 11 of the aircraft 10. A nose lift unit 15 is also referred to as NLU.

FIGS. 1 and 2 show a nose lift unit 15 of said type which is positioned on one side of the fuselage 11. It is also possible for two such nose lift units 15 to be used. The nose lift units 15 are preferably pivotable relative to the fuselage 11, specifically such that the respective nose lift unit 15 is pivoted out of the fuselage 11 for takeoff and landing, whereas the respective nose lift unit 15 is pivoted into the fuselage 11 for flight operation after takeoff and before landing of the aircraft 10.

For the forward thrust of the aircraft 10 after it has taken off, the aircraft 10 has at least one forward thrust unit 12, in the exemplary embodiment shown two forward thrust units 12, which are integrated into the rear end of the fuselage 11.

Each of a respective wing lift unit 14 and a respective nose lift unit 15 and a respective forward thrust unit 12 of the aircraft 10 may comprise a ducted fan 17.

Figure 3:
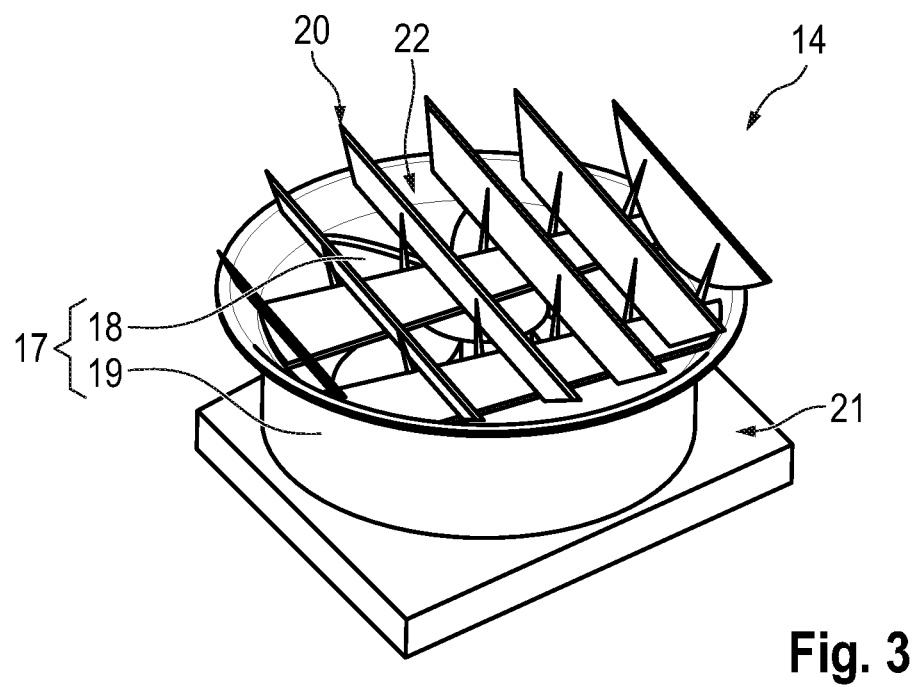
FIG. 3 shows a perspective view of a ducted fan of the aircraft together with slat units.
Figure 4:
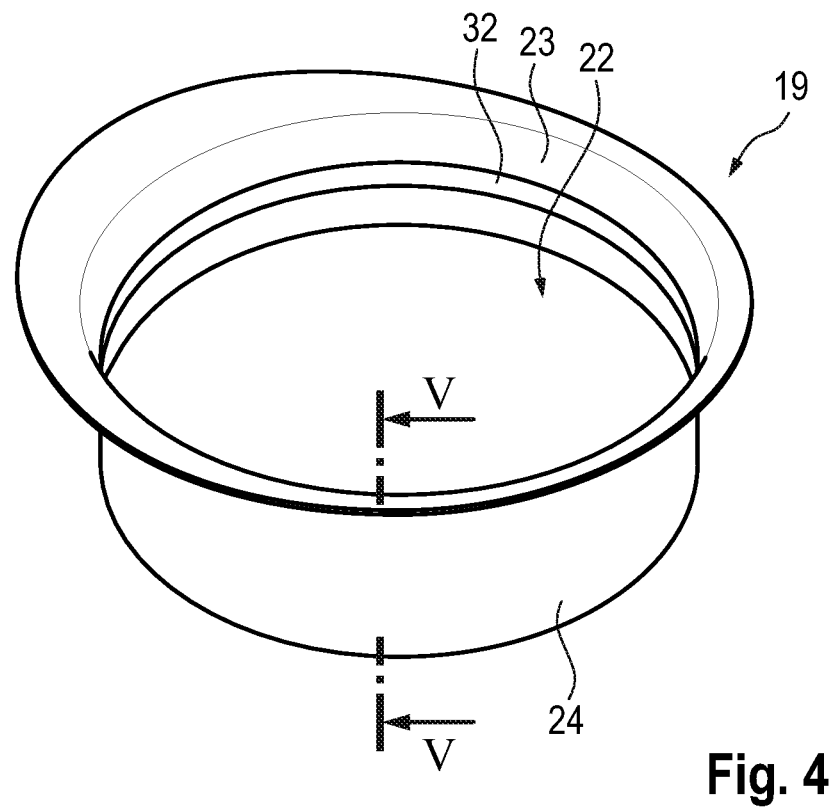
FIG. 4 shows a perspective view of a duct of the ducted fan.

FIG. 3 shows a perspective view of a wing lift unit 14 that comprises a ducted fan 17. Here, the ducted fan 17 has a rotor-side fan 18 and a stator-side duct 19. Furthermore, FIG. 3 shows slat units 20, 21, specifically an upper slat unit 20 and a lower slat unit 21, as further assemblies of the wing lift unit 14.

For takeoff and landing, the two slat units 20, 21 are opened, and open up a flow channel 22, which is defined by the duct 19 of the ducted fan 17, for a passage of flow. By contrast, if the wing lift units 14 are not required, in particular during normal flight operation after takeoff and before landing, then the slat units 20, 21 are closed, and close the flow channel 22 of the duct 19 of the respective ducted fan 17.

As already stated, a ducted fan 17 accordingly has the rotor-side fan 18 and the stator-side duct 19. The stator-side duct 19 defines a flow channel for air flowing via the fan 18, wherein said flow channel 22 extends in the axial direction A (see FIG. 5) of the ducted fan 17. As viewed in the radial direction R of the ducted fan 17, the duct 19 surrounds the rotor or fan 18 radially at the outside.

The duct 19 of the ducted fan 17 has an inner wall 23, which faces toward the fan 18 of the ducted fan 17, and an outer wall 24, which is averted from the fan 18. Both the inner wall 23 and the outer wall 24 are preferably composed in each case of at least one layer composed of fiber-reinforced plastic, preferably composed of a carbon-fiber-reinforced plastic or alternatively of a glass-fiber-reinforced plastic. The inner wall 23 of the duct 19 of the ducted fan 17 defines the flow channel 22 of the ducted fan 17 for the air flowing via the rotor 18.

Figure 6:
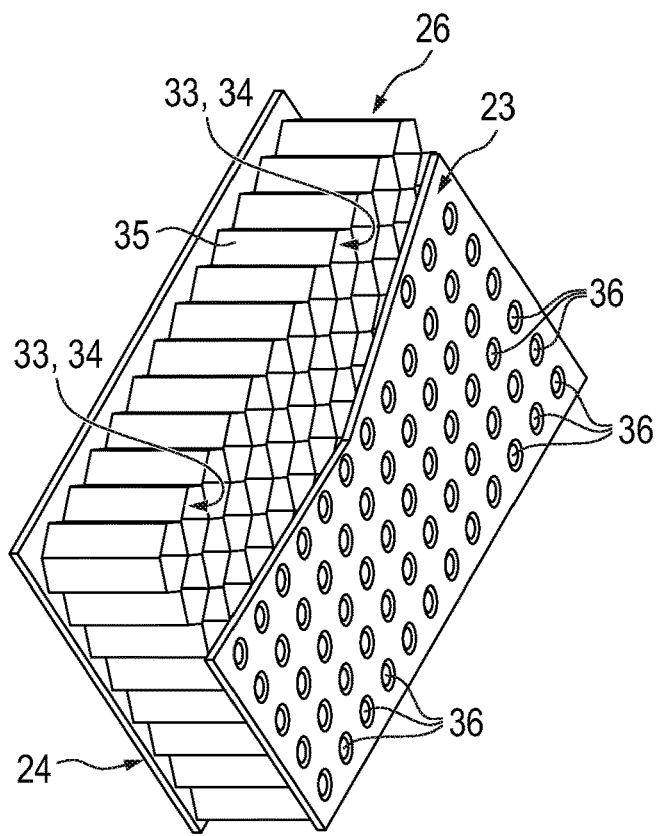
FIG. 6 shows the detail VI of FIG. 5.
Figure 7:
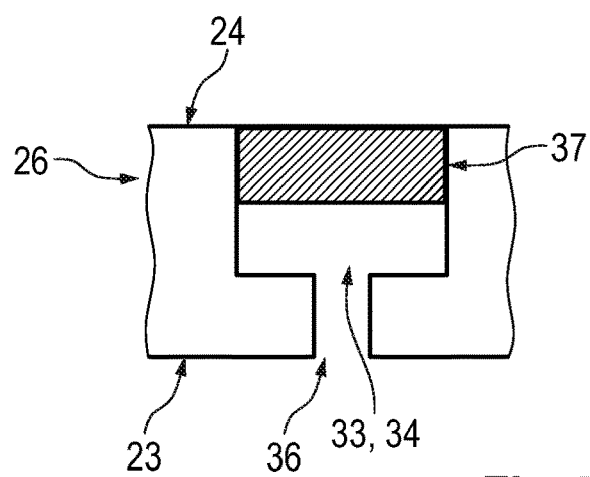
FIG. 7 is a schematic illustration of a detail of FIG. 6.

The inner wall 23 of the duct 19 of the ducted fan 17, which inner wall defines the flow channel 22 of the ducted fan 17 for the air flowing via the rotor 18, is perforated at least in certain sections. FIG. 6 shows recesses 36 of the inner wall 23, which form the perforation thereof.

Cavities 33 are formed between the inner wall 23 and the outer wall 24 of the duct 19 of the ducted fan 17. For this purpose, at least one honeycomb core with honeycombs 34 is preferably arranged between the inner wall 23 and the outer wall 24 of the duct 19, wherein the honeycombs 34 define the cavities 33.

FIG. 3 shows three honeycomb cores 25, 26 and 27 by way of example. The honeycomb core 27 is arranged between the honeycomb cores 25 and 26 as viewed in an axial direction A. The respective honeycomb core may be composed of a fiber-reinforced plastic.

Each of the honeycomb cores 25, 26 and 27 has a multiplicity of honeycombs 34 and thus cavities 33, wherein the honeycombs 34 extend in a radial direction R or substantially in the radial direction R of the ducted fan 17.

Figure 5:
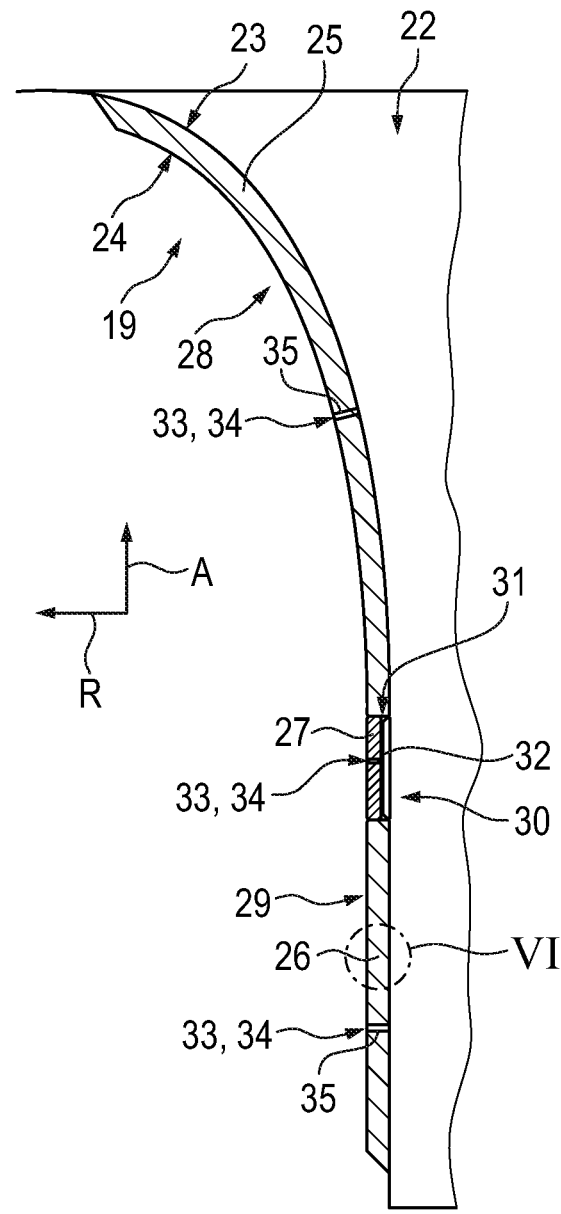
FIG. 5 shows the cross section V-V of FIG. 4.

In FIG. 5, in each case one honeycomb 34 is shown in the region of each honeycomb core 25, 26, 27. In the case of honeycombs 34 which extend in the radial direction R, honeycomb walls 35, which define the honeycombs 34 and thus cavities, of the respective honeycomb core 25, 26, 27 run in the radial direction R between the inner wall 23 and the outer wall 24. Adjoining the inner wall 23 and the outer wall 24, the honeycombs 34 of the respective honeycomb core 25, 26 and 27 are open.

In an inlet-side section 28 of the duct 19 of the ducted fan 17, in which said duct is contoured with a funnel-like curvature, the honeycombs 34 run substantially in the radial direction R of the duct 19 and thus of the ducted fan 17. The honeycombs 34 are then inclined relative to the radial direction R.

By contrast, in an outlet-side section 29 of the duct 19 and thus of the ducted fan 17, the honeycombs 34 of the respective honeycomb body 26, 27 run in the radial direction R. Here, the duct 19 of the ducted fan 17 has a tubular or cylindrical contour.

In a central region 30 of the duct 19 that is arranged between the inlet-side section 28 of the duct 19 and the outlet-side section 29 of the duct 19, the duct 19 of the ducted fan 17 has a notch 31 that receives a run-in body 32. Said run-in body 32 is preferably a foam body, wherein rotor blades of the rotor or fan 18 of the ducted fan 17 can run into said run-in body 32 during operation, in order that the rotor blades of the rotor or fan 18 are not damaged during operation.

At least some of the honeycombs 34 and thus cavities 33 are connected via the recesses 36 of the perforated inner wall 23 to the flow channel 22.

At least in the outlet-side section 29 of the duct 19, some of the honeycombs 34 and thus cavities 33 of the honeycomb body 26 are connected via the recesses 36 of the perforated inner wall 23 to the flow channel 22.

As stated above, honeycombs 34 that form cavities 33 are accordingly arranged between the inner wall 23 and the outer wall 24 of the duct 19 of the ducted fan 17. The cavities 33 defined by the honeycombs 34 are coupled via the recesses 36 of the perforated inner wall 23 to the flow channel 22 for air flowing via the fan 18 of the ducted fan 17. Sound-deadening resonators in the form of Helmholtz resonators are formed in this way.

The cavities 33 are filled, in a region which faces away from the inner wall 23 and thus faces toward the outer wall 24, with activated carbon.

Here, the activated carbon may be present in the form of an activated carbon nonwoven or an activated carbon mat.

It is alternatively possible for the activated carbon 37 to be present in the form of an activated carbon granulate that is held or fixed in a plastics membrane.

By virtue of the cavities 33 being filled with activated carbon, particularly advantageous sound deadening can be provided, and it is possible in particular for the frequency of the resonators to be adjusted in the direction of low frequencies of the order of 300 Hz to 1500 Hz. Particularly advantageous sound deadening can be ensured in this way.

That region of the cavities 33 which is filled with activated carbon occupies preferably between 10% and 60%, preferably between 20% and 60% or between 10% and 50%, of the volume of the respective cavity 33.

That region of the respective cavity 33 which is filled with activated carbon particularly preferably occupies between 20% and 40% of the volume of the respective cavity, wherein this activated-carbon-filled region of the cavity 33 faces away from the inner wall 23 and faces toward the outer wall 24.

The disclosure relates not only to the above-described ducted fan 17 but also to the duct 19 of the ducted fan 17 per se. The duct 19 of the ducted fan 17 is a component of an aircraft, having a first wall, specifically the perforated inner wall 23, having a second wall, specifically the outer wall 24, and having cavities 33 which are formed between said walls 23, 24 and which, forming the sound-deadening resonators, are coupled via the perforated first wall to the surroundings, specifically to the flow channel 22. As stated above, the cavities 33 are filled, in a region which faces away from the first wall and faces toward the second wall, with activated carbon.

The disclosure also relates to the aircraft 10. The aircraft 10 has the above-described fuselage 11 and the wings 13 that engage on the fuselage 11. Furthermore, the aircraft 10 has at least one ducted fan 17. The ducted fan 17 may engage on the wing 13 as a constituent part of a wing lift unit 14 or on the nose 16 of the fuselage 11 as a constituent part of a nose lift unit 15. The forward thrust unit 12 may also have a ducted fan 17. The respective ducted fan 17 is designed as described in detail above. In particular, the ducted fan 17 engages on a respective wing 13 as a constituent part of a wing lift unit 14.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A ducted fan of an aircraft, comprising:
   a rotor-side fan comprising rotor blades,
   a stator-side duct that surrounds the rotor-side fan radially at the outside and defines a flow channel for air flowing via the fan,
   wherein the stator-side duct has an inner wall that faces toward the rotor-side fan and which is perforated at least in certain sections,
   wherein the stator-side duct has an outer wall that faces away from the fan,
   wherein, between the inner wall and the outer wall of the stator-side duct, there are formed cavities which, forming sound-deadening resonators, are coupled via the perforated inner wall to the flow channel for the air flowing via the rotor-side fan,
   wherein the cavities of a first section of the certain sections are inclined with respect to a radial axis of the stator-side duct,
   wherein the cavities of the first section are filled, in a region which faces away from the inner wall and thus faces toward the outer wall, with activated carbon, and
   wherein the stator-side duct comprises a notched recess in the inner wall adjacent to the rotor-side fan, the notched recess being configured to receive a deformable body at least partially within the stator-side duct, and wherein the deformable body is configured to receive a force imparted by contact with the rotor blades during operation of the rotor-side fan such that the deformable body deforms and the rotor-side fan or the rotor blades are not damaged during operation.

2. The ducted fan as claimed in claim 1, wherein that region of the cavities which is filled with activated carbon occupies between 10% and 60% of the volume of the respective cavity.

3. The ducted fan as claimed in claim 1, wherein that region of the cavities which is filled with activated carbon occupies between 20% and 60% of the volume of the respective cavity.

4. The ducted fan as claimed in claim 1, wherein the activated carbon is present in the form of an activated carbon nonwoven or an activated carbon mat.

5. The ducted fan as claimed in claim 1, wherein the activated carbon is present in the form of an activated carbon granulate that is held in a plastics membrane.

6. The ducted fan as claimed in claim 1, wherein the cavities are formed by honeycomb bodies.

7. An aircraft, comprising:
   a fuselage which provides a passenger compartment,
   wings that engage on the fuselage,
   a ducted fan as claimed in claim 1, the ducted fan engaging on the fuselage or on the wings.

8. The ducted fan as claimed in claim 1, further comprising cavities of a second section of the certain sections, the cavities of the second section being substantially perpendicular to the radial axis.

9. The ducted fan as claimed in claim 8, further comprising cavities of a third section of the certain sections, the cavities of the third section being differently inclined with respect to the radial axis than the first section or the second section.

10. The ducted fan as claimed in claim 1, wherein a percentage of a volume of the cavities of the first section that is filled is based on an expected frequency of the rotor-side fan.

11. The ducted fan as claimed in claim 1, wherein the deformable body comprises a section of the cavities disposed on a same radial axis.

12. The ducted fan as claimed in claim 1, wherein the deformable body comprises a foam body positioned laterally adjacent to the rotor-side fan.

13. The ducted fan as claimed in claim 12, further comprising cavities of a fourth section of the certain sections, wherein the cavities comprise a first end opposite a second end, the first end closer to the inner wall and the second end closer to the outer wall, wherein the deformable body is positioned at least partially within the stator-side duct, and between the rotor-side fan and the first end of the cavities of the fourth section.

14. The ducted fan as claimed in claim 1, wherein the ducted fan is positioned within a wing of the aircraft, and wherein the ducted fan is configured to be positioned vertically with respect to a landing surface.

15. The ducted fan as claimed in claim 1. wherein the operation comprises a takeoff operation or a landing operation of the aircraft.

16. The ducted fan as claimed in claim 1, wherein the stator-side duct further comprises at least one layer of fiber-reinforced-plastic, and wherein the deformable body comprises a foam body.

17. A component of an aircraft, comprising:

a perforated first wall, a second wall, a plurality of cavities formed between the first wall and the second wall and which, forming sound-deadening resonators, are coupled via the perforated first wall to the surroundings, wherein the cavities are filled, in a region that faces away from the first wall and faces toward the second wall, with activated carbon, wherein a first cavity of the plurality of cavities is inclined with respect to a second cavity of the plurality of cavities, wherein the perforated first wall comprises a notched recess in a central region of the perforated first wall, the notched recess being configured to receive a deformable body at least partially within the perforated first wall, the deformable body configured to receive a force imparted by contact with rotor blades during operation of a rotor-side fan such that the deformable body deforms and the rotor-side fan or the rotor blades are not damaged during operation.

18. The component as claimed in claim 17, wherein the region of each cavity of the plurality of cavities that is filled with activated carbon occupies between 10% and 60% of the volume of the respective cavity.

19. The component as claimed in claim 17, wherein the activated carbon is present in the form of an activated carbon nonwoven or an activated carbon mat or an activated carbon granulate that is held in a plastics membrane.

20. The ducted fan as claimed in claim 17, wherein the operation comprises a takeoff operation or a landing operation of the aircraft.

* * * * *